United States Patent
Wang (10) Patent No.: US 10,798,220 B2
(45) Date of Patent: Oct. 6, 2020

(54) METHOD, DEVICE AND SYSTEM FOR INVOKING LOCAL SERVICE ASSEMBLY BY BROWSER

(71) Applicant: Alibaba Group Holding Limited, Grand Cayman (KY)

(72) Inventor: Yaoyao Wang, Hangzhou (CN)

(73) Assignee: Alibaba Group Holding Limited, Grand Cayman (KY)

( * ) Notice: Subject to any disclaimer, the term of this patent is extended or adjusted under 35 U.S.C. 154(b) by 232 days.

(21) Appl. No.: 15/448,463

(22) Filed: Mar. 2, 2017

(65) Prior Publication Data

US 2017/0180463 A1   Jun. 22, 2017

Related U.S. Application Data

(63) Continuation of application No. PCT/CN2015/088216, filed on Aug. 27, 2015.

(30) Foreign Application Priority Data

Sep. 3, 2014   (CN) .......................... 2014 1 0446702

(51) Int. Cl.
*G06F 11/30* (2006.01)
*G06F 11/34* (2006.01)
(Continued)

(52) U.S. Cl.
CPC .......... *H04L 67/42* (2013.01); *G06F 11/0766* (2013.01); *G06F 11/30* (2013.01);
(Continued)

(58) Field of Classification Search
CPC ......... H04L 29/00; H04L 29/02; H04L 29/06; H04L 29/06088; H04L 29/06544;
(Continued)

(56) References Cited

U.S. PATENT DOCUMENTS

| | | | | |
|---|---|---|---|---|
| 5,862,338 A | * | 1/1999 | Walker .................. | H04L 49/351 709/224 |
| 5,956,483 A | * | 9/1999 | Grate ...................... | G06Q 20/12 709/203 |

(Continued)

FOREIGN PATENT DOCUMENTS

| | | |
|---|---|---|
| CN | 101179562 A | 5/2008 |
| CN | 101960446 A | 1/2011 |

(Continued)

OTHER PUBLICATIONS

Shinder—The Pros and Cons of Behavioral Based Signature Based and Whitelist Based Security—2008.*

(Continued)

*Primary Examiner* — Tauqir Hussain
*Assistant Examiner* — Boris D Grijalva Lobos
(74) *Attorney, Agent, or Firm* — Lee & Hayes, P.C.

(57) ABSTRACT

A method, an apparatus and a system for invoking a local service component by a browser are provided. The method includes receiving, by a client terminal, a connection request based on a cross-domain communication protocol initiated by a browser terminal; performing, by the client terminal, validity verification of the connection request; and if the connection request passes the validity verification, establishing, by the client terminal, a communication connection with the browser terminal based on the cross-domain communication protocol to allow the browser terminal to invoke a local service component. The present disclosure can achieve an invocation of a local service component by most mainstream browsers, and has a better security of communications.

20 Claims, 3 Drawing Sheets

(51) Int. Cl.
*G06F 11/07* (2006.01)
*H04L 29/06* (2006.01)
*H04L 12/26* (2006.01)
*H04L 29/08* (2006.01)

(52) U.S. Cl.
CPC .......... *G06F 11/3055* (2013.01); *G06F 11/34* (2013.01); *H04L 29/06* (2013.01); *H04L 43/08* (2013.01); *H04L 43/0823* (2013.01); *H04L 67/02* (2013.01)

(58) Field of Classification Search
CPC ......... H04L 29/06551; H04L 29/06755; H04L 29/06823; H04L 29/06829; H04L 29/14; H04L 29/18; H04L 29/28; H04L 29/32; H04L 67/00; H04L 67/02; H04L 67/025; H04L 67/14; H04L 67/141; H04L 67/42; H04L 43/00; H04L 43/06; H04L 43/08; H04L 43/0823; H04L 41/00; H04L 41/06–0695; H04L 41/5032; G06F 11/00; G06F 11/006; G06F 11/30; G06F 11/3055; G06F 11/34
See application file for complete search history.

(56) References Cited

U.S. PATENT DOCUMENTS

| | | | | |
|---|---|---|---|---|
| 6,192,394 | B1* | 2/2001 | Gutfreund | G06Q 10/107 709/204 |
| 6,397,255 | B1* | 5/2002 | Nurenberg | H04L 29/06 709/228 |
| 6,640,261 | B1* | 10/2003 | Ni | G06F 13/362 709/232 |
| 6,687,751 | B1* | 2/2004 | Wils | H04L 12/40019 370/401 |
| 7,320,027 | B1* | 1/2008 | Chang | H04L 29/12377 709/219 |
| 7,707,310 | B2* | 4/2010 | Thubert | H04L 29/06 370/913 |
| 7,970,863 | B1* | 6/2011 | Fontaine | H04L 41/00 709/217 |
| 8,112,787 | B2* | 2/2012 | Buer | H04L 9/3271 713/168 |
| 8,572,427 | B1* | 10/2013 | Stancu-mara | H04L 43/0817 714/4.1 |
| 8,594,854 | B1* | 11/2013 | Tareen | H04L 12/10 700/295 |
| 8,601,131 | B1* | 12/2013 | Wood | G06F 16/957 709/227 |
| 8,863,248 | B2* | 10/2014 | Wendt | H04L 9/0863 726/4 |
| 9,116,706 | B2* | 8/2015 | Yunten | G06F 8/34 |
| 9,118,582 | B1* | 8/2015 | Martini | H04L 45/74 |
| 9,154,485 | B1* | 10/2015 | Fallows | H04L 63/08 |
| 9,304,796 | B1* | 4/2016 | Douglas | G06F 11/2028 |
| 9,317,360 | B2* | 4/2016 | Vargas | G06F 11/1004 |
| 9,367,415 | B1* | 6/2016 | Lachwani | G06F 11/362 |
| 9,369,482 | B2* | 6/2016 | Borohovski | G06F 21/577 |
| 9,405,933 | B2* | 8/2016 | Kubik | G06F 16/951 |
| 9,462,089 | B1* | 10/2016 | Fallows | H04L 69/22 |
| 9,467,483 | B2* | 10/2016 | Jolfaei | G06F 9/542 |
| 9,578,058 | B2* | 2/2017 | Benyo | H04L 67/34 |
| 9,660,995 | B2* | 5/2017 | Reiter | H04L 63/0428 |
| 9,756,086 | B1* | 9/2017 | McHugh | H04L 67/1004 |
| 10,153,944 | B2* | 12/2018 | Lin | H04L 49/10 |
| 2002/0080771 | A1* | 6/2002 | Krumel | H04L 29/06 370/352 |
| 2002/0165973 | A1* | 11/2002 | Ben-Yehezkel | H04L 1/1664 709/230 |
| 2003/0074650 | A1* | 4/2003 | Akgul | G06F 11/3624 717/129 |
| 2003/0152071 | A1* | 8/2003 | Lu | H04L 49/1515 370/380 |
| 2003/0174701 | A1* | 9/2003 | Angle | H04L 12/1881 370/390 |
| 2004/0107387 | A1 | 6/2004 | Larsson et al. | |
| 2004/0250253 | A1* | 12/2004 | Khartabil | G06F 9/545 719/310 |
| 2004/0264459 | A1* | 12/2004 | Yun | H04L 47/24 370/389 |
| 2005/0094658 | A1* | 5/2005 | Chen | H04L 49/201 370/432 |
| 2006/0050717 | A1* | 3/2006 | Lepakshaiah | H04L 45/00 370/400 |
| 2006/0112219 | A1* | 5/2006 | Chawla | G06F 3/0607 711/114 |
| 2006/0126619 | A1* | 6/2006 | Teisberg | H04L 29/12009 370/389 |
| 2006/0168654 | A1* | 7/2006 | Jennings | H04L 63/029 726/11 |
| 2006/0233114 | A1* | 10/2006 | Alam | H04L 41/069 370/252 |
| 2007/0043974 | A1* | 2/2007 | LeBlanc | G06F 11/2268 714/23 |
| 2007/0076635 | A1* | 4/2007 | Tallet | H04L 45/00 370/255 |
| 2008/0175154 | A1* | 7/2008 | Ong | H04L 41/0806 370/236 |
| 2008/0212472 | A1* | 9/2008 | Musacchio | H04L 49/254 370/232 |
| 2008/0228927 | A1* | 9/2008 | Toub | H04L 67/02 709/228 |
| 2008/0291919 | A1* | 11/2008 | Dunbar | H04L 45/245 370/395.3 |
| 2009/0328180 | A1 | 12/2009 | Coles et al. | |
| 2010/0002707 | A1* | 1/2010 | Chang | H04L 45/02 370/395.31 |
| 2010/0049782 | A1* | 2/2010 | Li | H04L 63/20 709/202 |
| 2010/0095367 | A1* | 4/2010 | Narayanaswamy | H04L 63/0245 726/12 |
| 2010/0290472 | A1* | 11/2010 | Raman | H04L 45/00 370/395.2 |
| 2010/0306547 | A1* | 12/2010 | Fallows | G06F 21/305 713/178 |
| 2010/0325287 | A1* | 12/2010 | Jagadeeswaran | H04L 67/22 709/227 |
| 2011/0264770 | A1 | 10/2011 | Kim et al. | |
| 2012/0072531 | A1* | 3/2012 | Akuzawa | G06F 9/4401 709/217 |
| 2012/0201138 | A1* | 8/2012 | Yu | H04L 47/2491 370/235 |
| 2013/0055289 | A1 | 2/2013 | Maltese et al. | |
| 2013/0239231 | A1* | 9/2013 | Korycki | H04L 67/34 726/29 |
| 2013/0246266 | A1* | 9/2013 | Coleman | G06Q 30/0641 705/44 |
| 2014/0059217 | A1* | 2/2014 | Pizurica | H04L 43/08 709/224 |
| 2014/0222930 | A1* | 8/2014 | Gangadharan | H04L 51/04 709/206 |
| 2014/0223453 | A1* | 8/2014 | Li | G06F 9/547 719/330 |
| 2014/0266794 | A1* | 9/2014 | Brown | A61B 5/0022 340/870.16 |
| 2014/0280995 | A1* | 9/2014 | Ezell | H04L 65/1016 709/229 |
| 2015/0138582 | A1* | 5/2015 | Ito | H04N 1/00925 358/1.13 |
| 2015/0180920 | A1* | 6/2015 | Hunter | H04L 67/025 709/203 |
| 2015/0188899 | A1* | 7/2015 | Bakar | H04L 67/125 726/9 |
| 2015/0347200 | A1* | 12/2015 | Fadel | G06F 21/53 719/319 |
| 2016/0078459 | A1* | 3/2016 | Borland | G06Q 30/0204 705/7.33 |

(56) References Cited

U.S. PATENT DOCUMENTS

| | | | | |
|---|---|---|---|---|
| 2016/0094436 A1* | 3/2016 | Elder | ............... | H04L 45/245 370/225 |
| 2016/0098261 A1* | 4/2016 | Habib | ............... | G06F 9/454 717/171 |
| 2016/0173387 A1* | 6/2016 | Chandrayana | ....... | H04L 67/28 370/231 |
| 2016/0255088 A1* | 9/2016 | Kaplan | ............ | H04L 63/102 726/7 |
| 2018/0026864 A1* | 1/2018 | Aoki | ............... | H04L 43/0852 370/242 |
| 2018/0095920 A1* | 4/2018 | Kwak | ............ | G06F 11/2005 |
| 2019/0036570 A1* | 1/2019 | Deng | ............ | H04W 72/0426 |

FOREIGN PATENT DOCUMENTS

| | | |
|---|---|---|
| CN | 102647429 A | 8/2012 |
| CN | 103036871 | 4/2013 |
| CN | 103049320 | 4/2013 |
| CN | 103605525 | 2/2014 |
| CN | 103914453 | 7/2014 |
| JP | 2008059451 | 3/2008 |
| JP | 2013140634 | 7/2013 |

OTHER PUBLICATIONS

What is a Web Browser—Definition from Techopedia—Jul. 3, 2014.*
Break Down—definition in the Cambridge English Dictionary—2019.*
Breakdown—Definition by the Merriam-Webster Dictionary—2019.*
Stephen Cooper, "What Is a Listening Port" 2017, It Still Works.*
The Extended European Search Report dated Mar. 23, 2018 for European Patent Application No. 15838137.6, 9 pages.
Fette, et al., "RFC 6455, The WebSocket Protocol", retrieved on Mar. 24, 2017 at <<https://tools.ietf.org/html/rfc6455>>, Internet Engineering Task Force, Dec. 2011, pp. 1-72.
Translation of Chinese Office Action from related Chinese Patent Application No. 201410446702.2, dated Nov. 5, 2018, 8 pages.
Translation of Chinese Search Report from related Chinese Patent Application No. 201410446702.2, dated Feb. 23, 2018, 1 page.
Translation of Chinese Search Report from related Chinese Patent Application No. 201410446702.2, dated Oct. 25, 2018, 1 page.
I. Fette et al., "RFC 6455—The WebSocket Protocol," <<https://tools.ietf.org/html/rfc6455>>, Dec. 2011, 72 pages.
Translation of Japanese Search Report from related Japanese Patent Application No. 2017-512311, dated Apr. 24, 2019, 16 pages.
Tomita, "It is a practical use," WEB+DB Press, Technical Hyronsha, Sep. 25, 2009, vol. 52, first edtion, 11 pages.
The Japanese Office Action dated May 14, 2019 for Japanese Patent Application No. 2017-512311, a counterpart of U.S. Appl. No. 15/448,463, 11 pages.
Machine translation (English) of the First Chinese Office Action dated Mar. 5, 2018 for Chinese Patent Application No. 201410446702.2, 10 pages.
Machine translation (English) of the Third Chinese Office Action dated May 14, 2019 for Chinese Patent Application No. 201410446702.2, 14 pages.
International Search Report from the corresponding PCT application No. PCT/CN2015/088216, dated Oct. 30, 2015, 2 pages.
Chinese Search Report dated May 5, 2019 for Chinese Patent Application No. 2014104467022, 1 page.
Written Opinion from the corresponding PCT application No. PCT/CN2015/088216, dated Oct. 30, 2015, 4 pages.
The European Office Action dated Jul. 23, 2019, for European Patent Application No. 15838137.6, a counterpart foreign application of the U.S. Appl. No. 15/448,463, 7 pages.
Ozses et al., "Using JSONP for Cross-Domain Communication," retrieved on Jul. 26, 2019, at https://www.ibm.com/developerworks/cn/web/wa-aj-jsonp1/, published on May 25, 2009, 5 pages.
The Singapore Written Opinion dated Apr. 7, 2020 for Singapore Application No. 10201901701X, 6 pages.
Machine translation the Chinese Final Rejetion dated Dec. 12, 2019, for Chinese Patent Appliacation 20141046702.2, a counterpart foreign application of U.S. Appl. No. 15/448,463, 16 pages.

* cited by examiner

METHOD, DEVICE AND SYSTEM FOR INVOKING LOCAL SERVICE ASSEMBLY BY BROWSER

CROSS REFERENCE TO RELATED PATENT APPLICATIONS

This application claims priority to and is a continuation of PCT Patent Application No. PCT/CN2015/088216, filed on 27 Aug. 2015, and which claims priority to and is related to Chinese Patent Application No. 201410446702.2, filed on 3 Sep. 2014, entitled "Method, device and System for Invoking Local Service Assembly by Browser," which are hereby incorporated by reference in their entirety.

TECHNICAL FIELD

The present disclosure relates to the field of communication technologies, and in particular, to a method, an apparatus and a system for implementing invocation of a local service component by a browser.

BACKGROUND

A browser plugin such as an NPAPI (Netscape Plugin Application Programming Interface) is a universal interface for executing an external application in a browser. An execution of an external application may also be referred to as an invocation of a local service component. The invocation of a local service component may include installing a digital certificate, deleting a digital certificate, verifying a digital certificate, acquiring environment information of a local machine such as a mac address of a network card, etc. Besides NPAPI, current common browser plugins having similar functions further include a BHO (Browser Helper Object), Native Messaging, JS-Ctypes, etc.

However, these browser plugins have some problems, which are specifically as follows:

Although almost all graphical interface browsers (except for IE) of desktop terminals support NPAPI, improper writing of an NPAPI plugin may cause a breakdown of a browser, or even lead to a malware attack to a system because no security consideration is made when NPAPI is designed. Moreover, the NPAPI plugin does not support mobile devices, and is on the verge of elimination at present. Currently, most of the latest browsers (such as chrome and Firefox, etc.) do not support NPAPI, and a browser plugin cannot be used to acquire local information or verify a digital certificate of a website. BHO, which is proposed by Microsoft, is an industry standard for a browser to open an interactive interface to third-party programmers, and an interactive interface in the field of the browser may be entered through simple codes. Moreover, a number of IE browser personalizing tools are now implemented using BHO. However, BHO only supports the IE browser, and is limited in applications. Moreover, Google adds a new Native Messaging interface in a new chrome browser thereof, to replace an original NPAPI. However, Native Messaging only supports the chrome browser at present, and an extension needs to be installed in the browser. Similarly, JS-Ctypes only support the Firefox browser, and similarly, an extension needs to be installed in the browser.

Therefore, under the circumstance where NPAPI is to be eliminated but other browser plugins are not universal, a solution, which has a strong universality and a good security, and is capable of implementing invocation of a local service component by most mainstream browsers, is in urgent need currently.

SUMMARY

This Summary is provided to introduce a selection of concepts in a simplified form that are further described below in the Detailed Description. This Summary is not intended to identify all key features or essential features of the claimed subject matter, nor is it intended to be used alone as an aid in determining the scope of the claimed subject matter. The term "techniques," for instance, may refer to device(s), system(s), method(s) and/or computer-readable instructions as permitted by the context above and throughout the present disclosure.

An objective of embodiments of the present disclosure is to provide a method, an apparatus and a system for implementing invocation of a local service component by a browser, to ensure most mainstream browsers to be able to invoke a local service component while taking security into account.

To achieve the above objective, in one aspect, the embodiments of the present disclosure provide a method for implementing invocation of a local service component by a browser. In implementations, a client terminal receives a request for establishing connection based on a cross-domain communication protocol, is the request being initiated by a browser terminal. The client terminal performs validity verification of the connection request. If the connection request passes the validity verification, the client terminal establishes a communication connection with the browser terminal based on the cross-domain communication protocol to enable the browser terminal to invoke a local service component.

In another aspect, the embodiments of the present disclosure further provide an apparatus for implementing invocation of a local service component by a browser. In implementations, the apparatus may be a client terminal, and include a connection request reception module configured to receive a request for establishing a connection based on a cross-domain communication protocol, the request being initiated by a browser terminal; a validity verification module configured to perform validity verification of the connection request; and a connection control module configured to establish a communication connection with the browser terminal based on the cross-domain communication protocol to enable the browser terminal to invoke a local service component if the connection request passes the validity verification.

In still another aspect, the embodiments of the present disclosure further provide a system for implementing an invocation of a local service component by a browser. In implementations, the system may include a browser terminal to initiate a connection request based on a cross-domain communication protocol to a client terminal; and the client terminal to perform validity verification of the connection request, and establish a communication connection with the browser terminal based on the cross-domain communication protocol to allow the browser terminal to invoke a local service component if the connection request passes the validity verification.

In implementations, the client terminal supports the cross-domain communication protocol and most existing mainstream browsers also support the cross-domain communication protocol, the client terminal is able to establish a communication channel with an existing mainstream browser. As such, under the circumstance that NPAPI is to be eliminated at present but other browser plugins are not universal, a communication solution enabling most mainstream browsers to invoke a local service component is provided. Furthermore, in implementations, prior to establishing a communication connection with a browser, the client terminal performs validity verification of a connection request of the browser. The communication connection for invoking a local service component can be established only when the request passes the validity verification. Therefore, the embodiments of the present disclosure also possess a function of preventing a malicious website from utilizing a client terminal, thereby improving the security of communication for a browser to invoke a local service component.

BRIEF DESCRIPTION OF THE DRAWINGS

Accompanying drawings described herein are used to provide further understanding of the embodiments of the present disclosure, constitute a part of the present disclosure, and are not construed as limitations to the embodiments of the present disclosure. In the accompanying drawings.

DETAILED DESCRIPTION

In order to make the objectives, technical solutions and advantages of the embodiments of the present disclosure in a more comprehensible manner, the embodiments of the present disclosure are described herein in further detail with reference to the embodiments and the accompanying drawings. Illustrative examples and corresponding descriptions of the embodiments of the present disclosure are used to explain implementations, and are not to be construed as limiting the embodiments of the present disclosure.

Details of implementations of the embodiments of the present disclosure are described herein in further detail with reference to the accompanying drawings.

Figure 1:
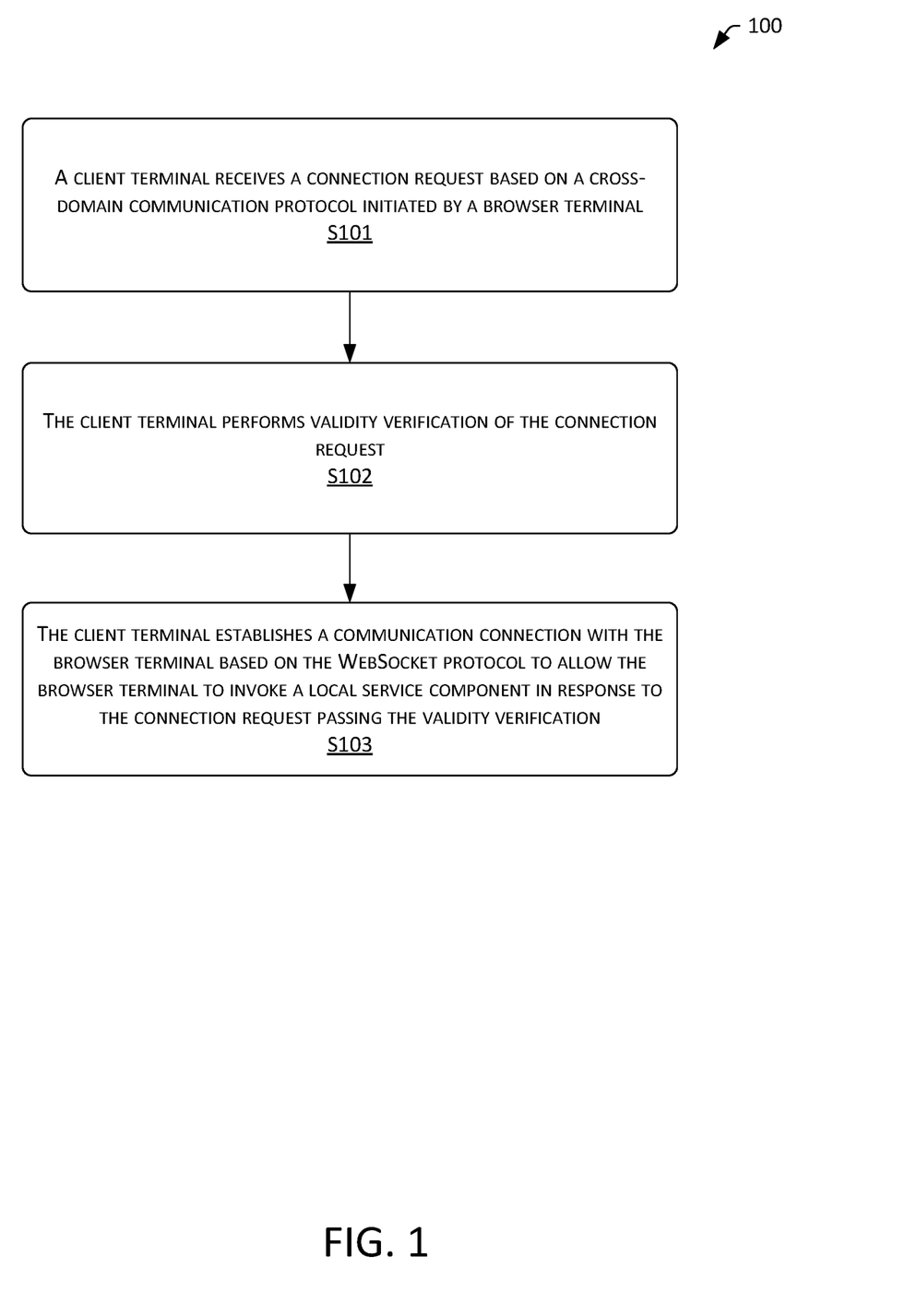
FIG. 1 is a flowchart of an exemplary method for implementing invocation of a local service component by a browser according to an embodiment of the present disclosure.

FIG. 1 shows a flowchart of a method 100 for implementing invocation of a local service component by a browser according to an embodiment of the present disclosure. In implementations, the method 100 may include the following operations.

At S101, a client terminal receives a request for a establishing a connection based on a cross-domain communication protocol, the request being initiated by a browser terminal. When the browser terminal needs to invoke a local service component, the browser terminal initiates a connection request based on a WebSocket protocol to the client terminal, and the client terminal receives the request correspondingly. The WebSocket protocol is a network technology of full duplex communications. In the WebSocket protocol, communication parties only need a handshake action to quickly form a communication channel between the communication parties, and mutual data transmission may be directly conducted between the communication parties. Current mainstream browsers (such as Chrome16+, 1E10+, Firefoxl1+, Safari6.0+, Opera12.10+, 360 Security Browser, 360 Chrome, Taobao™ Browser, Sogou Browser, UC Browser, Cheetah Browser, and Maxthon Browser) all support the WebSocket protocol.

In implementations, a cross-domain communication protocol needs to be used between a client terminal and a browser, to enable most mainstream browsers to invoke a local service component. The cross-domain refers to crossing system security domains. In implementations, a WebSocket protocol may be used. However, the embodiments of the present disclosure may also use other cross-domain communication protocols (such as a JSONP protocol and a CORS protocol, etc.) as an alternative. However, the JSONP protocol has a limit on the size of a data packet that is sent, and if the length of data that is sent exceeds the limit, the rest of the data may be truncated. When the CORS protocol is used, a special field needs to be added to a Response header that is returned by a client terminal to a server. The client terminal, however, cannot send a message to the server proactively, and the server needs to query the client terminal ceaselessly about whether there is data to be sent to the server. The WebSocket protocol does not have the limits of the above two protocols, and can establish a bi-directional communication channel for communication parties quickly. Moreover, when this type of communication approach of the WebSocket protocol is used, even the client terminal breaks down, a website cannot perceive this, because the client terminal can restart at the back end and resume an associated service. Therefore, the experience of the website is improved.

At S102, the client terminal performs validity verification of the connection request. If the validity verification succeeds, S103 is performed. Otherwise, the client terminal disconnects a connection with the browser terminal, to prevent a malicious website from utilizing the client terminal. In this operation, the purpose of the validity verification is to prevent a malicious website from utilizing the client terminal. In this way, the malicious website cannot obtain information of a local machine using the client terminal, thereby improving the security of communications. In this operation, the validity verification may include verification by determining whether a website corresponding to the browser terminal initiating the connection request is a website included in a website white list. This is because a relative few number of websites need to invoke a local service component generally. Thus, verification using a website white list may accelerate the processing speed of validity verification of a client terminal. Apparently, the validity verification may also adopt other approaches, such as token verification, in this operation. The token verification refers to encryption using a non-symmetric encryption algorithm, and only a legal website can generate such token. A client terminal can identify modifications made to the token, and thus refuse a connection.

At S103, the client terminal establishes a communication connection with the browser terminal based on the WebSocket protocol to allow the browser terminal to invoke a local service component in response to the connection request passing the validity verification. After the communication connection is established, a process for the browser terminal to invoke a local service component may include the following operations:

1) the browser terminal sending a command to the client terminal;

2) the client terminal parsing the command and delivering the command to a corresponding local service component;

3) the local service component processing the command and returning a processing result to the client terminal; and 4) the client terminal forwarding the processing result to the browser terminal.

In implementations, upon receiving the connection request based on the WebSocket protocol initiated by the browser terminal, the client terminal selects a port from a port list for binding according to a set port binding priority order. Moreover, the port binding priority order is consistent with a port selection priority order of the browser terminal. For example, the port list includes four selectable ports, namely, A, B, C and D, and the port binding priority order of the client terminal is A>B>C>D. Similarly, the port selection priority order of the browser terminal is also A>B>C>D. In this way, when the most preferred port A is occupied by another software, the client terminal and the browser terminal may both attempt to select the port B first, thereby being conducive to improving the success rate of establishing a connection, and shortening the time for establishing the connection.

Moreover, in implementations, when the client terminal breaks down, the client terminal sends a breakdown report thereof to the server, for performing corresponding improvements and upgrades on the client terminal according to the breakdown report at a later time. The breakdown report may include information such as an error code, an error location, and a current state, etc. The client terminal may obtain the breakdown report by invoking a fault diagnostic program that is built in an operating system via an Application Programming Interface (API) of the operating system.

In implementations, the client terminal may update the website white list by querying the server periodically about whether an update of the website white list exists, and submitting a request for acquiring the update if affirmative.

In implementations, since the client terminal supports the WebSocket protocol and most existing mainstream browsers also support the WebSocket protocol, the client terminal is able to establish a communication channel with an existing mainstream browser. As such, under the circumstance that NPAPI is to be eliminated at present and other browser plugins are not universal, a communication method that enables a majority of mainstream browsers to invoke a local service component is provided. Furthermore, in implementations, prior to establishing a communication connection with a browser, the client terminal performs validity verification of the connection request of the browser, and the communication connection will be established therewith only when the request passes the validity verification. Therefore, the embodiments of the present disclosure also possess a function of preventing a malicious website from utilizing a client terminal, thereby improving the security of communications associated with an invocation of a local service component by a browser.

Figure 2:
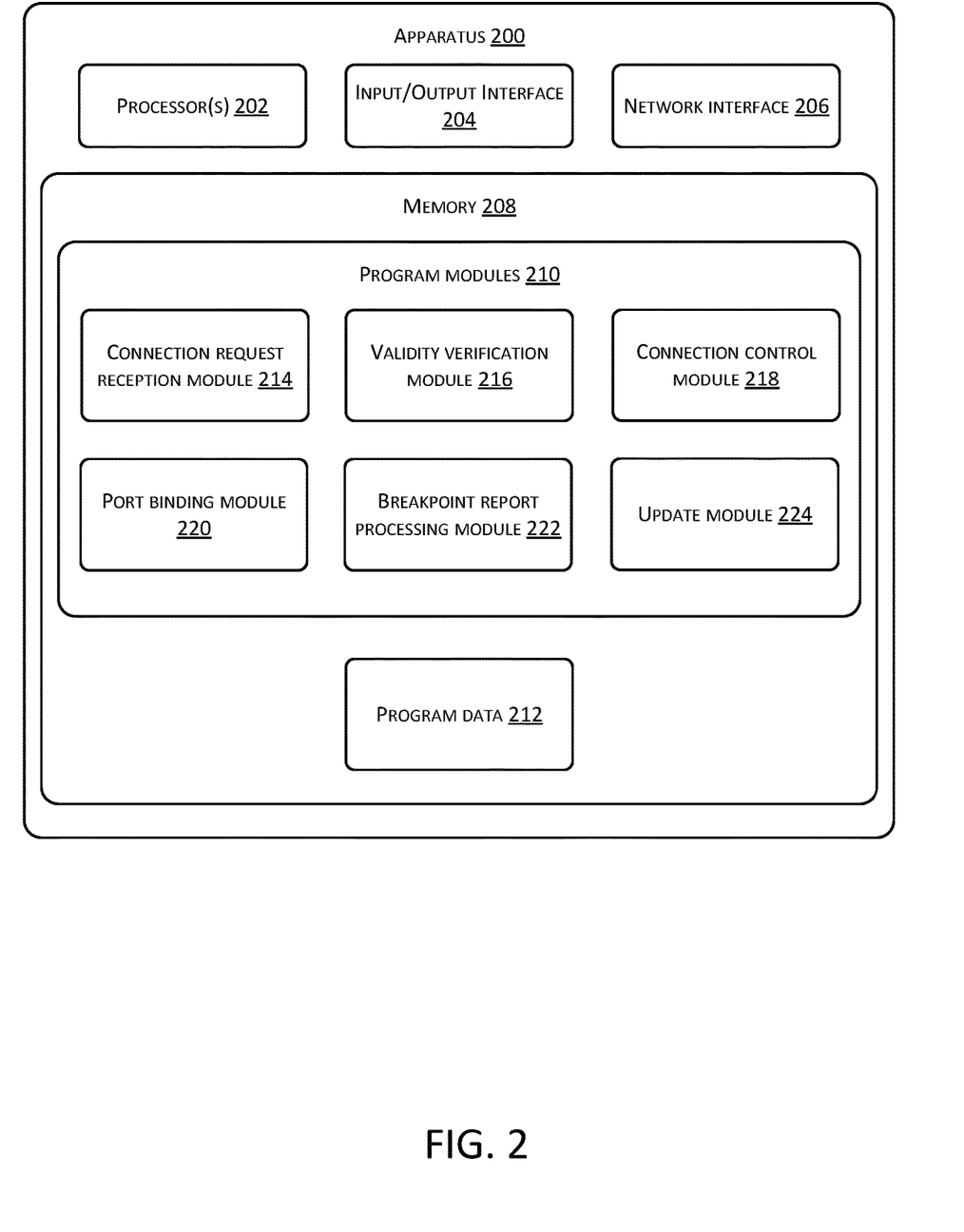
FIG. 2 is a logic structural diagram of an exemplary apparatus for implementing invocation of a local service component by a browser according to an embodiment of the present disclosure.

FIG. 2 shows a structural diagram of an example apparatus 200 for implementing invocation of a local service component by a browser according to an embodiment of the present disclosure. In implementations, the apparatus 200 may be a client terminal. In implementations, the apparatus 200 may include one or more processors 202, an input/output (I/O) interface 204, a network interface 206, and memory 208.

The memory 208 may include a form of computer-readable media, e.g., a non-permanent storage device, random-access memory (RAM) and/or a nonvolatile internal storage, such as read-only memory (ROM) or flash RAM. The memory 208 is an example of computer-readable media.

The computer-readable media may include a permanent or non-permanent type, a removable or non-removable media, which may achieve storage of information using any method or technology. The information may include a computer-readable instruction, a data structure, a program module or other data. Examples of computer storage media include, but not limited to, phase-change memory (PRAM), static random access memory (SRAM), dynamic random access memory (DRAM), other types of random-access memory (RAM), read-only memory (ROM), electronically erasable programmable read-only memory (EEPROM), quick flash memory or other internal storage technology, compact disk read-only memory (CD-ROM), digital versatile disc (DVD) or other optical storage, magnetic cassette tape, magnetic disk storage or other magnetic storage devices, or any other non-transmission media, which may be used to store information that may be accessed by a computing device. As defined herein, the computer-readable media does not include transitory media, such as modulated data signals and carrier waves.

In implementations, the memory 208 may include program modules 210 and program data 212. In correspondence with the foregoing method 100, the program modules 210 may include a connection request reception module 214, a validity verification module 216, and a connection control module 218.

The connection request reception module 214 may receive a connection request based on a cross-domain communication protocol initiated by a browser terminal. When the browser terminal needs to invoke a local service component, the browser terminal initiates a connection request based on a WebSocket protocol to the client terminal, and the connection request reception module 214 receives the request correspondingly. The WebSocket protocol is a network technology of full duplex communications between a browser and a server. In the WebSocket protocol, communication parties only need a handshake action to form a communication channel quickly between the communication parties, and mutual data transmission may be directly conducted between the communication parties. Current mainstream browsers (such as Chrome16+, IE10+, Firefox11+, Safari6.0+, Opera12.10+, 360 Security Browser, 360 Chrome, Taobao™ Browser, Sogou Browser, UC Browser, Cheetah Browser, and Maxthon Browser) all support the WebSocket protocol.

In implementations, a cross-domain communication protocol needs to be used between a client terminal and a browser, to enable most mainstream browsers to invoke a local service component. The cross-domain refers to crossing system security domains. In implementations, a WebSocket protocol may be used. In other implementations, other cross-domain communication protocols (such as a JSONP protocol and a CORS protocol, etc.) may also be used as an alternative. However, the JSONP protocol has a limit on the size of a data packet that is sent, and if the length of data that is sent exceeds the limit, the rest of the data may be truncated. When the CORS protocol is used, a special field needs to be added to a Response header that is returned by a client terminal to a server. The client terminal, however, cannot send a message to the server proactively, and the server needs to query the client terminal ceaselessly about whether there is data to be sent to the server. The WebSocket protocol does not have the limits of the above two protocols, and can establish a bi-directional communication channel for communication parties quickly. Moreover, when this type of communication approach of the WebSocket protocol is used, even the client terminal breaks down, a website cannot perceive this, because the client terminal can restart at the back end and resume an associated service. Therefore, the experience of the website is improved.

The validity verification module 216 is configured to perform validity verification of the connection request. The purpose of the validity verification is to prevent a malicious website from utilizing the client terminal, thereby improving the security of communications. In implementations, the validity verification module 216, may perform the validity verification via verification that determines whether a website corresponding to the browser terminal initiating the connection request is a website included in a website white list. This is because a relative few number of websites need to invoke a local service component, generally a few tens. Thus, verification using a website white list may accelerate the processing speed of validity verification of a client terminal. Apparently, the validity verification may also use other approaches, such as token verification, in this operation. The token verification refers to encryption using a non-symmetric encryption algorithm, and only a legal website can generate such token. A client terminal can identify modifications made to the token, and thus refuse a connection.

The connection control module 218 is configured to establish a communication connection with the browser terminal based on the WebSocket protocol to allow the browser terminal to invoke a local service component in response to the connection request passing the validity verification. Otherwise, the connection with the browser terminal is disconnected to prevent a malicious website from utilizing the client terminal. After the communication connection is established, a process for the browser terminal to invoke a local service component may include the following:

1) the browser terminal sending a command to the client terminal;

2) the client terminal parsing the command and delivering the command to a corresponding local service component;

3) the local service component processing the command and returning a processing result to the client terminal; and 4) the client terminal forwarding the processing result to the browser terminal.

In implementations, the apparatus 200 or the client terminal may further include a port binding module 220 configured to select a port from a port list for binding according to a set port binding priority order when the connection request reception module 214 receives the connection request based on the cross-domain communication protocol initiated by the browser terminal, where the port binding priority order is consistent with a port selection priority order of the browser terminal. For example, the port list includes four selectable ports, namely, A, B, C and D, and the port binding priority order of the client terminal is A>B>C>D. Similarly, the port selection priority order of the browser terminal is also A>B>C>D. In this way, when the most preferred port A is occupied by another software, the port binding module 220 and the browser terminal may both attempt to select the port B first, thereby being conducive to improving the success rate of establishing a connection, and shortening the time for establishing the connection.

In implementations, the apparatus 200 or the client terminal may further include a breakdown report processing module 222 configured to send a breakdown report of the client terminal to the server upon determining that the client terminal breaks down, for performing corresponding improvements and upgrades on the client terminal according to the breakdown report at a later time. The breakdown report may include information such as an error code, an error location, and a current state, etc. The breakdown report processing module 222 may obtain the breakdown report by invoking a fault diagnostic program that is built in an operating system via an Application Programming Interface of the operating system.

Moreover, in implementations, the apparatus 200 or the client terminal may further include an update module 224 configured to update the website white list at the client terminal by querying the server periodically.

In implementations, since the client terminal supports the WebSocket protocol and most existing mainstream browsers also support the WebSocket protocol, the client terminal is able to establish a communication channel with an existing mainstream browser. As such, under the circumstance that NPAPI is to be eliminated at present but other browser plugins are not universal, a communication method that enables a majority of mainstream browsers to invoke a local service component is provided. Furthermore, in implementations, prior to establishing a communication connection with the browser, the client terminal performs validity verification of the connection request of the browser, and the communication connection will be established therewith only when the request passes the validity verification. Therefore, the embodiments of the present disclosure also possess a function of preventing a malicious website from utilizing a client terminal, thereby improving the security of communications associated with an invocation of a local service component by a browser.

Figure 3:
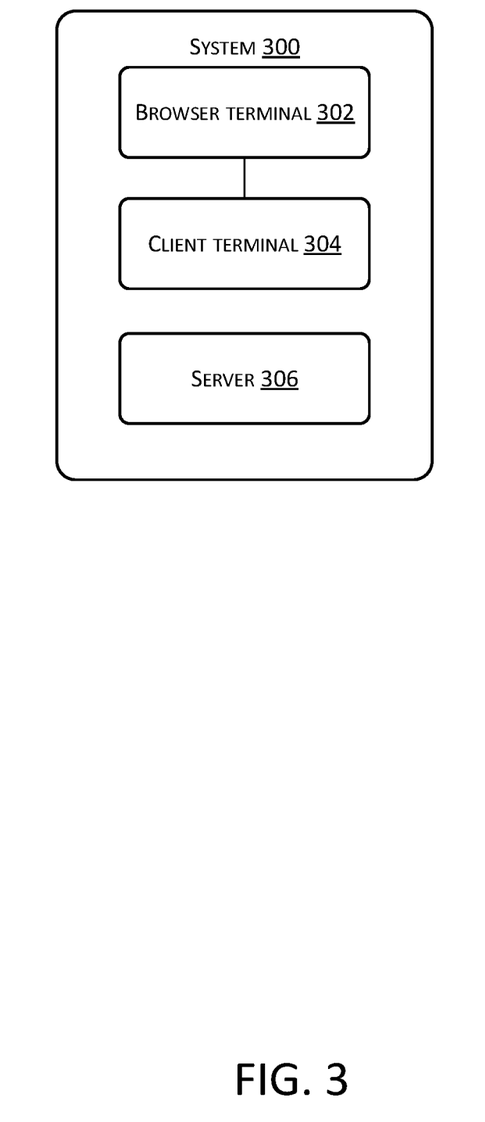
FIG. 3 is a logic structural diagram of an exemplary system for implementing invocation of a local service component by a browser according to an embodiment of the present disclosure.

FIG. 3 shows a structural diagram of a system 300 for implementing invocation of a local service component by a browser according to an embodiment of the present disclosure. In implementations, the system 300 may include a browser terminal 302 and a client terminal 304.

The browser terminal 302 is configured to initiate a connection request based on a cross-domain communication protocol to the client terminal 304.

The client terminal 304 is configured to perform validity verification of the connection request sent by the browser terminal 302, and establish a communication connection between the client terminal 304 and the browser terminal 302 based on the WebSocket protocol if the connection request passes the validity verification, to allow the browser terminal to invoke a local service component. Details of the client terminal 304 may be obtained by referencing to the foregoing embodiments of the present disclosure, and are not repeatedly described herein.

In implementations, the system 300 may further include a server 306 configured to receive and store a breakdown report sent by the client terminal 302.

In implementations, since the client terminal supports the WebSocket protocol and most existing mainstream browsers also support the WebSocket protocol, a communication channel may be established between the client terminal and an existing mainstream browser. As such, under the circumstance that NPAPI is to be eliminated at present and other browser plugins are not universal, enabling a majority of mainstream browsers to invoke a local service component is achieved. Furthermore, in implementations, prior to establishing a communication connection with a browser, the client terminal performs validity verification of the connection request of the browser, and the communication connection will be established therewith only when the request passes the validity verification. Therefore, the embodiments of the present disclosure also possess a function of preventing a malicious website from utilizing a client terminal, thereby improving the security of communications.

One skilled in the art may further understand that each illustrative logical block, unit and operation listed may be implemented by hardware, software or a combination thereof. Whether an implementation is performed using hardware or software depends on a specific application and a design requirement of the entire system. One skilled in the art may use a variety of methods to implement the function(s) for each specific application, but such implementation should not be understood as falling outside the scope of protection of the embodiments of the present disclosure.

Function(s) of each illustrative logical block or unit described in the foregoing embodiments may be implemented or operated via a general-purpose processor, a digital signal processor, an Application Specific Integrated Circuit (ASIC), a field-programmable gate array or another programmable logic device, a discrete gate or transistor logic, a discrete hardware component, or any combination thereof. The general-purpose processor may be a microprocessor, and optionally, the general-purpose processor may also be any conventional processor, controller, micro-controller or state machine. The processor may also be implemented using a combination of computing devices, such as a digital signal processor and a microprocessor, multiple microprocessors, one or more microprocessors associated with a digital signal processor core, or any other similar configurations.

The operations of the methods or algorithms described in the foregoing embodiments may be directly embedded in hardware, software module(s) executed by processor(s), or a combination thereof. Software module(s) may be stored in a RAM memory, a flash memory, a ROM memory, an EPROM memory, an EEPROM memory, a register, a hard disk, a removable disk, a CD-ROM, or a storage media in any other form in the field. As an illustration, a storage media may be coupled to a processor, such that the processor can read information from the storage media, and can store and write information into the storage media. Optionally, a storage media may also be integrated into a processor. The processor and the storage media may be disposed in an ASIC, and the ASIC may be disposed in a user terminal. Optionally, the processor and the storage media may also be disposed in different components of the user terminal.

In one or more exemplary designs, the foregoing functions described in the foregoing embodiments may be implemented in hardware, software, firmware, or any combination thereof. If being implemented in software, these functions may be stored in a computer readable media, or transmitted to a computer readable media in a form of one or more instructions or codes.

The exemplary embodiments described above describe the objectives, technical solutions and beneficial effects of the embodiments of the present disclosure in further detail. It should be understood that the above descriptions are merely exemplary embodiments of the embodiments of the present disclosure, and are not intended to limit the scope of protection of the embodiments of the present disclosure. Any modifications, equivalent replacements, improvements, etc., that are made without departing from the spirit and principles of the embodiments of the present disclosure shall fall within the scope of protection of the embodiments of the present disclosure.

What is claimed is:

1. A method implemented by a client terminal, the method comprising:
   receiving a request for establishing a communication connection based on a cross-domain communication protocol from a browser terminal;
   performing a validity verification of the request; and
   establishing the communication connection with the browser terminal based on the cross-domain communication protocol to allow the browser terminal to invoke a local service component, after the request passes the validity verification, the establishing the communication including:
      pre-setting a port binding priority order of the client terminal to be consistent with a port selection priority order of the browser terminal;
      selecting a port from a port list for binding according to the port binding priority order of the client terminal, the selecting including:
         in response to determining that a first port on the port binding priority order of the client terminal and the port selection priority order of the browser terminal is occupied, prompting both the client terminal and the browser terminal to select a second port using the port selection priority order, the second port being next to the first port in the port binding priority order of the client terminal and the port selection priority order of the browser terminal; and
      establishing the communication between the client terminal and the browser terminal by using the port.

2. The method of claim 1, wherein the port binding priority order is the same as the port selection priority order.

3. The method of claim 1, further comprising sending an error report from the client terminal to a server when the client terminal errs.

4. The method of claim 3, further comprising obtaining the error report by invoking a fault diagnostic program built in an operating system via an application programming interface of the operating system.

5. The method of claim 3, wherein the error report comprises at least an error code, an error location, and a current state.

6. The method of claim 1, wherein the cross-domain communication protocol comprises a WebSocket protocol, a JSONP protocol, or a CORS protocol.

7. The method of claim 1, wherein the validity verification comprises determining whether a website corresponding to the browser terminal from which the request is received is a website included in a website white list.

8. The method of claim 7, further comprising updating the website white list by querying a server periodically.

9. The method of claim 1, further comprising:
   receiving a command sent by the browser terminal;
   parsing the command and delivering the command to the local service component;
   receiving a processing result returned by the local service component after processing the command; and
   forwarding the processing result to the browser terminal.

10. An apparatus comprising:
    one or more processors; and
    memory stored thereon computer-readable instructions that, when executed by the one or more processors, cause the one or more processors to perform acts comprising:
       receiving a connection request based on a cross-domain communication protocol from a browser terminal;
       performing a validity verification of the connection request; and
       establishing a direct communication connection between the browser terminal and a client terminal based on the cross-domain communication protocol to enable the browser terminal to invoke a local service component, after the connection request passes the validity verification, the establishing the direct communication including: selecting a port from a port list for binding according to a port binding priority order of the client terminal, the port binding priority order of the client terminal being consistent with a port selection priority order of the browser terminal, both the browser terminal and the client terminal residing on the apparatus, the selecting including:

in response to determining that a first port on the port binding priority order of the client terminal and the port selection priority order of the browser terminal is occupied, prompting both the client terminal and the browser terminal to select a second port using the port selection priority order, the second port being next to the first port in the port binding priority order of the client terminal and the port selection priority order of the browser terminal.

11. The apparatus of claim 10, wherein the port binding priority order is the same as the port selection priority order.

12. The apparatus of claim 10, wherein the acts further comprise sending an error report to a server upon determining that the apparatus errs.

13. The apparatus of claim 12, wherein the acts further comprise obtaining the error report by invoking a fault diagnostic program built in an operating system via an application programming interface of the operating system.

14. The apparatus of claim 12, wherein the error report comprises at least an error code, an error location, and a current state.

15. The apparatus of claim 10, wherein the cross-domain communication protocol comprises a WebSocket protocol, a JSONP protocol, or a CORS protocol.

16. The apparatus of claim 10, wherein the validity verification comprises determining whether a website corresponding to the browser terminal from which the connection request is received is a website included in a website white list.

17. The apparatus of claim 16, wherein the acts further comprise updating the website white list by querying a server periodically.

18. A system comprising:

a browser terminal that initiates a connection request based on a cross-domain communication protocol to a client terminal; and the client terminal comprising one or more processors; memory stored thereon computer-readable instructions that, when executed by the one or more processors, cause the one or more processors to perform acts including:

performing a validity verification of the connection request;

establishing a communication connection with the browser terminal stored on the client terminal based on the cross-domain communication protocol to enable the browser terminal stored on the client terminal to invoke a local service component, after the connection request passes the validity verification; and selecting a port from a port list for binding according to a port binding priority order of the client terminal, the port binding priority order of the client terminal being consistent with a port selection priority order of the browser terminal, the selecting including:

in response to determining that a first port on the port binding priority order of the client terminal and the port selection priority order of the browser terminal is occupied, prompting both the client terminal and the browser terminal to select a second port using the port selection priority order, the second port being next to the first port in the port binding priority order of the client terminal and the port selection priority order of the browser terminal.

19. The system of claim 18, further comprising a server to receive and store a breakdown report sent by the client terminal.

20. The system of claim 19, wherein the breakdown report comprises at least an error code, an error location, and a current state.

* * * * *